March 21, 1950 T. MURAKAMI 2,501,077

RATIO DETECTOR CIRCUIT

Filed Dec. 26, 1947

INVENTOR

TOMOMI MURAKAMI

BY Philip J. Cooper

ATTORNEY

Patented Mar. 21, 1950

2,501,077

UNITED STATES PATENT OFFICE 2,501,077

RATIO DETECTOR CIRCUIT

Tomomi Murakami, Swarthmore, Pa., assignor to Radio Corporation of America, a corporation of Delaware Application December 26, 1947, Serial No. 794,064

9 Claims. (Cl. 250—27)

Figure 1:
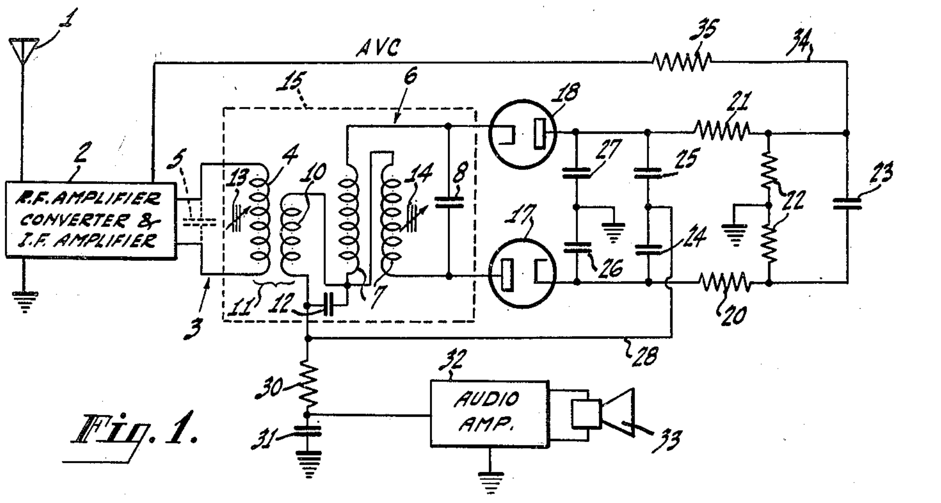

This invention relates generally to circuits for demodulating an angle-modulated carrier wave, and particularly relates to a ratio detector having a minimum response to the coincidental amplitude modulation of an angle-modulated carrier wave.

Various circuits have been devised in the past for demodulating an angle-modulated carrier wave. The term "angle-modulated carrier wave" is meant to include a frequency-modulated or a phase-modulated carrier wave or hybrid forms of modulation possessing characteristics common to both of them. During the generation, transmission and reception of an angle-modulated carrier wave undesired amplitude modulation may be caused by the transmitter directly, may be due to interfering impulses such as external noise, or they may be caused by the lack of a uniform gain over the passband of the receiver signal-selector. Finally, the undesired amplitude modulation may be caused by interference of the waves which have traveled over different paths between the transmitter and the receiver.

Most of the prior art frequency demodulators are responsive not only to frequency modulation but also to the coincidental amplitude modulation of the angle-modulated carrier wave. The ratio detector, however, which is a particular type of frequency discriminator or demodulator, is in first approximation not responsive to the amplitude modulation of an angle-modulated carrier wave.

The conventional ratio detector has been described on pages 140 to 147 of the book entitled "F-M Simplified" by Milton S. Kiver, published in 1947 by D. Van Nostrand Co., Inc., New York, New York.

By utilizing a ratio detector in a radio receiver a limiter stage is made superfluous. Since a limiter stage limits the amplitude of the modulated carrier-wave, less amplification is required ahead of a ratio detector than is required when other conventional frequency demodulator circuits which employ a limiter are used in the receiver. The reason for this difference is that a conventional frequency demodulator is responsive to the difference between the voltages developed by two rectifiers, while the ratio detector responds to the ratio of these two voltages, and the ratio remains constant, at least in first approximation regardless of variations in amplitude of the modulated carrier-wave. However, the undesired amplitude variations of a carrier wave due to multipath transmission may become so large that even a conventional ratio detector will be somewhat responsive to such a large undesired amplitude modulation of the carrier wave.

It is, accordingly, an object of the present invention to provide an improved ratio detector which is substantially less responsive to the coincidental amplitude modulation of an angle-modulated carrier wave than previously known ratio detectors.

A further object of the invention is to provide a ratio detector circuit arranged to minimize the response of the circuit to the unbalanced amplitude-modulation component of the modulated wave so that the response of the circuit to amplitude modulation is a minimum at the center frequency.

Another object of the invention is to provide a ratio detector which will develop demodulated output signal even if the amplitude of the modulated carrier wave should be suddenly reduced.

A conventional ratio detector comprises a frequency-discriminator network to which are coupled two rectifiers such as vacuum diodes. A first bias means which may, for example, consist of a stabilizing condenser of low impedance to modulation-frequency currents and a by-pass resistor is connected to the output of the rectifiers. The first bias means, that is, the by-pass resistor, forms a direct current path with the rectifiers and functions to apply a mean bias voltage to the rectifiers which remains substantially constant for short-time amplitude variations of the carrier wave. The stabilizing condenser and its by-pass resistor should accordingly have a long time constant.

In accordance with the present invention, there is further provided a second bias means which may be coupled to the rectifiers. The second bias means may, for example, consist of series resistors connected between the output of the rectifiers and the first bias means. The second bias means, that is, the series resistors permit the mean bias voltage established by the first bias means to vary to a predetermined extent in response to short-time amplitude variations of the carrier wave. Consequently, the rectifiers are prevented from biasing off in response to a sudden reduction of the carrier wave amplitude. A conventional load condenser of low impedance to the carrier wave is connected between a point of the discriminator network and the output of one of the rectifiers for developing the demodulated audio signal. By choosing the two series resistors of unequal resistance the response of the ratio detector to the unbalanced amplitude-modulation component of the wave may be minimized. Furthermore, by proper choice of the resistance of the series resistors the ratio detector can be made less responsive to undesired coincidental amplitude modulation of the modulated wave than previously known ratio detectors.

Figures 2, 3:
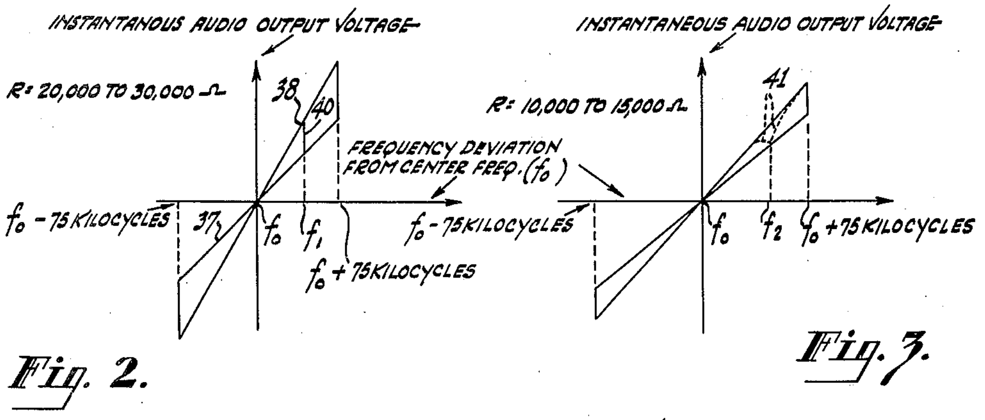
Figure 4:
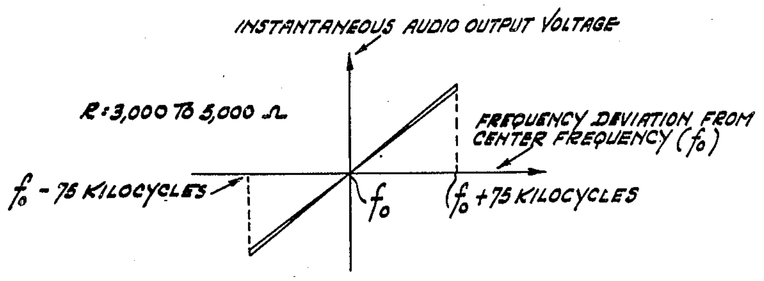

The novel features that are considered characteristic of this invention are set forth with particularity in the appended claims. The invention, itself, however, both as to its organization and method of operation, as well as additional objects and advantages thereof, will best be understood from the following description when read in connection with the accompanying drawing, in which:

Fig. 1 is a circuit diagram, partly in block form, of a radio receiver for receiving an angle-modulated carrier wave and including a ratio detector embodying the present invention; and Figs. 2 to 4 are graphs illustrating the instantaneous audio output voltage of the ratio detector of the invention plotted against the deviation of the carrier frequency from the center frequency for various resistance values of two series resistors provided in accordance with the present invention.

Referring now to Fig. 1, there is illustrated a super-heterodyne receiver for receiving an angle-modulated carrier wave which may be intercepted by antenna 1. The carrier wave may be amplified by one or more radio-frequency amplifiers, converted to an intermediate-frequency signal and further amplified by one or more intermediate-frequency amplifiers shown by box 2, which is conventional practice.

It will be understood that radio-frequency amplifier, converter and intermediate-frequency amplifier 2 is adapted to receive and amplify not only frequency-modulated carrier waves but also phase-modulated waves. A frequency-modulated wave is developed at a transmitter by varying the frequency of the carrier wave about its center or mean frequency in proportion to the amplitude of the modulating signal and at a speed depending upon the frequency of the modulating signal. A phase-modulated wave differs from a frequency-modulated wave in that the frequency deviation from the center frequency increases with the frequency of the modulating signal. Thus, the generic expression "angle modulation" also includes a modulated carrier-wave of preferably constant amplitude where the modulation contains components resembling both frequency and phase modulation and is therefore a hybrid modulation.

The intermediate-frequency wave to which the intercepted carrier-wave is converted has conventionally a frequency of 10.7 megacycles for a broadcast receiver. The last intermediate-frequency amplifier or driver stage included within box 2 has its output coupled to primary circuit 3 forming part of the frequency-discriminator network. Primary circuit 3 includes coil 4 which may be broadly tuned to the intermediate frequency by the distributed capacitance of coil 4 and by the interelectrode capacitance of the driver stage as indicated at 5. The secondary circuit 6 includes the two bifilar sections of secondary coil 7 and condenser 8 arranged in parallel.

Tertiary coil 10 is very tightly coupled to primary coil 4 as indicated by bracket 11. One terminal of tertiary coil 10 is connected to the midpoint of secondary coil 7, while the other terminal of tertiary coil 10 is coupled to the midpoint of secondary coil 7 by condenser 12. Condenser 12 has a small capacitance which is partly reflected into primary circuit 3 and thus contributes to the capacitance of the primary circuit. Primary circuit 3 may be tuned to the center frequency by a magnetically permeable core or slug 13 while secondary circuit 6 may be tuned by slug 14. The frequency-discriminator network which includes primary circuit 3 and secondary circuit 6 preferably is enclosed by a shield or can indicated by dotted lines 15.

Two rectifiers such as vacuum diodes 17 and 18, which may also be twin diodes or dry rectifiers are provided for rectifying the intermediate-frequency wave. The anode of diode 17 and the cathode of diode 18 are each connected to one terminal of secondary circuit 6. In accordance with the present invention series resistors 20 and 21 form together with resistor 22 a direct current path for the rectified current developed by diodes 17 and 18. Thus, the cathode of diode 17 is connected to series resistor 20 while the anode of diode 18 is connected to series resistor 21. The midpoint of resistor 22 may be grounded as shown, or alternatively, the junction point between resistors 20 and 22 may be connected to ground, which is conventional in a ratio detector.

Resistor 22 is by-passed by stabilizing condenser 23 which has a low impedance to modulation frequency currents and accordingly will by-pass audio currents. The time constant of the network consisting of resistor 22 and condenser 23 is of the order of 0.1 second. The series combination of resistors 20, 22 and 21 forming a resistive network is by-passed by series-connected load condensers 24 and 25 which have a low impedance to the intermediate-frequency wave but a high impedance to the modulation-frequency currents. Finally, the cathode of diode 17 and the anode of diode 18 are interconnected by a further pair of condensers 26 and 27 having their junction point grounded. Condensers 26 and 27 have a low impedance to the intermediate-frequency wave and therefore function as by-pass condensers to maintain the cathode of diode 17 and the anode of diode 18 at an intermediate-frequency ground potential.

The low alternating potential terminal of tertiary coil 10 is connected through lead 28 to the junction point of load condensers 24 and 25. The audio signal developed across load condenser 24 may be derived from lead 28 and is impressed through filter resistor 30 by-passed to ground by intermediate frequency by-pass condenser 31, upon audio amplifier 32 and is reproduced by loud speaker 33.

An automatic volume control voltage may be derived from the junction point between stabilizing condenser 23 and by-pass resistor 22. The automatic volume control voltage which is of negative polarity may be impressed through lead 34 and filter resistor 35 upon one or more of the intermediate-frequency amplifier stages 2, which is conventional. If the junction point of resistors 20 and 22 is connected to ground instead of grounding the midpoint of by-pass resistor 22, an automatic volume control voltage of larger amplitude may be obtained from lead 34.

The ratio detector illustrated in Fig. 1 responds to angle-modulated waves in a conventional manner. Neglecting for the moment the effect of resistors 20 and 21 provided by this invention, at the center frequency the currents through diodes 17 and 18 are equal in magnitude, and no audio signal is derived from lead 28. However, when the frequency of the carrier wave deviates from the center frequency, the frequency-discriminator network becomes unbalanced, and the currents through diodes 17 and 18 are consequently of unequal magnitude. The voltage across stabilizing condenser 23 and by-pass resistor 22 represent a bias voltage for diodes 17 and 18 and is maintained substantially constant for short time variations. Accordingly, the voltage at the junction point of load condensers 24, 25 varies with the frequency of the signal but is, in first approximation, not affected by variations in amplitude of the carrier wave. However, if the amplitude of the modulated carrier wave is suddenly reduced, the constant bias voltage developed across stabilizing condenser 23 and by-pass resistor 22 biases off diodes 17, 18 so that a distorted output signal is developed. The audio signal is derived from lead 28 which connects tertiary coil 10 to the junction point between load condensers 24, 25.

Consider now the operation of the ratio detector of Fig. 1 when the circuit is provided with resistors 20 and 21. The bias voltage developed across stabilizing condenser 23 and by-pass resistor 22 is still maintained substantially constant for short-time variations. Accordingly, stabilizing condenser 23 and resistor 22 represent a first bias means for applying a mean bias voltage to diodes 17 and 18. The audio signal current flowing through the resistive network 21, 22 and 20 will develop a voltage drop across series resistors 21 and 20. If now the amplitude of the modulated carrier-wave is suddenly reduced to a low value which may be caused by multipath transmission interference, less current will flow through the resistive network 21, 22 and 20 so that the voltage drops across series resistors 21 and 20 are reduced. Consequently, the bias voltage applied to diodes 17 and 18 is reduced, thereby permitting the diodes to conduct current even when the carrier wave amplitude is reduced. The resistive network 21, 22 and 20 consequently represents a second bias means which permits the mean bias voltage as applied to diodes 17, 18 to vary to a predetermined extent in response to short-time amplitude variations of the carrier wave. Thus, diodes 17 and 18 are prevented from biasing off completely upon a reduction of the carrier wave amplitude.

Furthermore, series resistors 20 and 21 have the effect of reducing the load on primary coil 4 and secondary coil 7 and in general they reduce the variable portion of the load of the frequency-discriminator network, it being well known that the load of the frequency discriminator network of a ratio detector varies with the amplitude of the carrier wave.

By proper choice of the resistance value of resistors 20 and 21 the ratio detector may be made substantially not responsive to the undesired amplitude modulation of the modulated carrier wave as will presently be explained. Referring now to Fig. 2 there is shown the instantaneous audio output voltage as obtained from lead 28 of the circuit of Fig. 1 plotted against the frequency deviation of the input wave from the center frequency $f_0$. The curves in Fig. 2 illustrate the audio output voltage obtained by modulating the applied carrier-wave over the full modulation range of ±75 kilocycles at the rate of 1,000 cycles per second. This input wave was simultaneously amplitude modulated at a frequency of 60 cycles per second and at a 60 per cent modulation level. The two lines 37 and 38 indicate the audio output voltages obtained for different carrier-wave amplitudes and, accordingly, line 40 indicates the response of the ratio detector of Fig. 1 to the amplitude-modulation component of the signal at the frequency $f_1$. The curve of Fig. 2 was obtained with resistors 20 and 21 each having a resistance value of between 20,000 and 30,000 ohms in the circuit of Fig. 1.

By utilizing the same input wave as was used to obtain the curves of Fig. 2, the curves of Fig. 3 illustrate the output voltage which results when resistors 20 and 21 each have a resistance value of between 10,000 and 15,000 ohms. If the amplitude of the carrier wave should for any reason be reduced to a low value at a particular frequency $f_2$ due, for example, to multipath transmission interference, the response of the ratio detector is as indicated by dotted curve 41. The resultant signal distortion then depends on the response of the circuit to amplitude modulation represented by the length of line 40. It will be seen from an inspection of Fig. 3 that although the audio response of the ratio detector is reduced as compared to the condition illustrated in Fig. 2, it is less sensitive to coincidental amplitude modulation of the signal.

The curve of Fig. 4 was obtained with the same input wave as was utilized for plotting Figs. 2 and 3 with the only exception that the resistance value of each resistor 20 and 21 was reduced to between 3,000 and 5,000 ohms. It will be seen that the ratio detector is now substantially not responsive to the undesired amplitude modulation component of the signal. Consequently, the ratio detector circuit of the invention is insensitive to a sudden reduction of the amplitude of the carrier wave to a low value at a particular frequency which may be caused by interference due to multipath transmission of the modulated carrier wave. The resistance values of resistors 20 and 21 for which the curve of Fig. 4 was obtained represent the optimum resistance values. If the resistance values of resistors 20 and 21 are further reduced, an audio output voltage similar to that illustrated in Figs. 3 and 2 will be obtained. While it will be understood that the circuit specifications of the ratio detector of the invention may vary according to the design for any particular application, the following circuit specifications are included by way of example only:

| | | |
|---|---|---|
| Condenser 12 | micromicrofarads | 33 |
| Condenser 8 | do | 15 |
| Condenser 26 | microfarads | 0.001 |
| Condenser 27 | do | 0.001 |
| Load condenser 24 | micromicrofarads | 330 |
| Load condenser 25 | do | 330 |
| Stabilizing condenser 23 | microfarads | 10 |
| Resistor 22 | ohms | 15,000 |
| Series resistor 20 | do | 3,300 |
| Series resistor 21 | do | 5,600 |

The actual resistances of series resistors 20 and 21 depend on the particular design of the ratio detector and specifically on that of the frequency-discriminator network. Therefore, for another type of transformer excellent results have been obtained with a resistance of resistor 20 of 1,000 ohms and a resistance of resistor 21 of 1,500 ohms. The optimum resistance values of resistors 20 and 21 may be obtained by adjusting the resistance until the optimum amplitude rejection as plotted in Fig. 4 is obtained. This may best be observed in a cathode ray oscilloscope to which the instantaneous audio output voltage is applied.

By making series resistors 20 and 21 of unequal resistance the response of the ratio detector to the unbalanced amplitude modulation component of the wave may be minimized or eliminated. This simply means that the response of the ratio detector to amplitude modulation is a minimum at the center frequency. If this should not be so, that is, if the minimum response of the ratio detector to amplitude modulation is at some other frequency, there exists an unbalanced amplitude modulation signal component. In that case, lines 37 and 38 illustrated in Fig. 2 will not intersect each other at the center frequency. For the purpose of eliminating this undesired component, the ratio detector circuit may be purposely unbalanced by choosing resistors 20 and 21 of unequal resistance until lines 37 and 28 cross each other at the center frequency, as observed on a cathode ray oscilloscope, which, in turn, will counterbalance or eliminate the unbalanced amplitude modulation component.

Accordingly, it will be seen that by choosing series resistors 20 and 21 of the proper resistance values the response of the ratio detector to amplitude modulation may be minimized, and in particular the unbalanced amplitude modulation component may be completely eliminated.

What is claimed is:

1. A ratio detector for receiving an angle-modulated carrier wave comprising a frequency-discriminator network, two rectifiers having their input coupled to said network, a first bias means connected to the output of said rectifiers to form a direct current path therewith and applying a mean bias voltage to said rectifiers which remains substantially constant for short-time amplitude variations of the carrier wave, a second bias means coupled to said rectifiers and permitting said mean bias voltage to vary to a predetermined extent in response to short-time amplitude variations of the carrier wave, thereby to prevent said rectifiers from biasing off in response to a sudden reduction of said carrier wave amplitude, and a condenser of low impedance to the carrier wave connected between a point of said network and the output of one of said rectifiers.

2. A ratio detector for receiving an angle-modulated carrier wave comprising a frequency-discriminator network, two rectifiers having their input coupled to said network, a first bias means connected to the output of said rectifiers to form a direct current path therewith and applying a mean bias voltage to said rectifiers which remains substantially constant for short-time amplitude variations of the carrier wave, a second bias means including a resistive impedance element coupled to said rectifiers and permitting said mean bias voltage to vary to a predetermined extent in response to short-time amplitude variations of the carrier wave, thereby to prevent said rectifiers from biasing off in response to a sudden reduction of said carrier wave amplitude, and a condenser of low impedance to the carrier wave connected between a point of said network and the output of one of said rectifiers.

3. A ratio detector for receiving an angle-modulated carrier wave comprising a frequency-discriminator network, two rectifiers having their input coupled to said network, a first bias means connected to the output of said rectifiers to form a direct current path therewith and applying a mean bias voltage to said rectifiers which remains substantially constant for short-time amplitude variations of the carrier wave, a second bias means including a resistor connected between said first bias means and the output of said rectifiers and permitting said mean bias voltage to vary to a predetermined extent in response to short-time amplitude variations of the carrier wave, thereby to prevent said rectifiers from biasing off in response to a sudden reduction of said carrier wave amplitude, and a condenser of low impedance to the carrier wave connected between a point of said network and the output of one of said rectifiers.

4. A ratio detector for receiving an angle-modulated carrier wave comprising a frequency-discriminator network, two rectifiers coupled to said discriminator network, a resistive network connected to both of said rectifiers to form a direct current path therewith, a first condenser of low impedance to modulation-frequency currents by-passing a portion of said resistive network, and a second condenser of low impedance to the carrier wave connected between a point on said discriminator network and the junction point between one of said rectifiers and said resistive network.

5. A ratio detector for receiving an angle-modulated carrier wave comprising a frequency-discriminator network, two rectifiers coupled to said discriminator network, a resistive network connected in series with said rectifiers to form a direct current path therewith, a first condenser of low impedance to modulation-frequency currents by-passing an intermediate portion of said resistive network, and a second condenser of low impedance to the carrier wave connected between a point on said discriminator network and the output electrode of one of said rectifiers.

6. The combination of a source of an angle-modulated carrier wave with a ratio detector comprising a frequency-discriminator network for said wave, two rectifiers coupled to said discriminator network, a first, a second and a third resistor connected in series with said rectifiers to form a direct current path therewith, a first condenser of low impedance to modulation-frequency currents connected in shunt across said second resistor, and a second condenser of low impedance to said wave connected from a point on said discriminator network to the junction point between one of said rectifiers and one of said resistors for deriving a modulation voltage thereacross, said second and third resistors being of unequal resistance for minimizing the response of said detector to the unbalanced amplitude-modulation component of said wave.

7. The combination of a source of an angle-modulated carrier wave with a ratio detector comprising a frequency-discriminator network for said wave, a first and a second rectifier, the anode of said first rectifier and the cathode of said second rectifier being connected to predetermined spaced points of said discriminator network, a first condenser of low impedance to modulation-frequency currents, a first resistor in shunt with said first condenser, a second and a third resistor connected in series with said first resistor and between the cathode of said first rectifier and the anode of said second rectifier, and a second condenser of low impedance to said wave connected from a point on said discriminator network to the cathode of said first rectifier for deriving a modulation voltage thereacross, said second and third resistors being of unequal resistance for minimizing the response of said detector to the unbalanced amplitude-modulation component of said wave.

8. The combination of a source of an angle-modulated carrier wave with a ratio detector comprising a frequency-discriminator network for said wave, two rectifiers coupled to said discriminator network, a first condenser of low impedance to modulation-frequency currents, a first resistor in shunt with said first condenser, a second and a third resistor connected in series with said first resistor and said rectifiers to form a direct current path therewith, a pair of series-connected condensers of low impedance to said wave connected across said rectifiers, and a circuit coupled between a point on said discriminator network and the junction point between said pair of condensers for deriving a modulation voltage.

9. The combination of a source of an angle-modulated carrier wave with a ratio detector comprising a frequency-discriminator network for said wave, a first and a second diode, the anode of said first diode and the cathode of said second diode being connected to predetermined spaced points of said discriminator network, a first condenser of low impedance to modulation-frequency currents, a first resistor in shunt with said first condenser, a second and a third resistor connected individually between said first resistor and the cathode of said first diode and between said first resistor and the anode of said second diode, a first pair of series-connected condensers of low impedance to said wave connected across said resistors, the junction point between said first pair of condensers being connected to a point on said discriminator network, and a further pair of series-connected condensers of low impedance to said wave in parallel with said first pair of condensers, said second and third resistors being of unequal resistance for minimizing the response of said detector to the unbalanced amplitude-modulation component of said wave.

TOMOMI MURAKAMI.

REFERENCES CITED

The following references are of record in the file of this patent:

UNITED STATES PATENTS

| Number | Name | Date |
|---|---|---|
| 2,341,325 | Kenefake | Feb. 8, 1944 |

OTHER REFERENCES

Ratio Detectors for F-M Receivers, pages 18, 19 and 20 of Radio for October 1945.